United States Patent [19]
Kato et al.

[11] Patent Number: 5,863,333
[45] Date of Patent: *Jan. 26, 1999

[54] SURFACE MODIFYING APPARATUS FOR RESIN MOLDINGS

[75] Inventors: Mamoru Kato; Yasuhiko Ogisu, both of Nagoya; Nobuyoshi Tanaka, Inazawa, all of Japan

[73] Assignee: Toyoda Gosei Co., Ltd., Aichi-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 606,040

[22] Filed: Feb. 16, 1996

[30] Foreign Application Priority Data

Feb. 16, 1995 [JP] Japan .................. 7-028439

[51] Int. Cl.$^6$ .............. B05B 7/06; B28B 11/00
[52] U.S. Cl. .............. 118/315; 118/64; 118/73; 425/445
[58] Field of Search .................. 118/313, 315, 118/326, 72, 73, 58, 62, 63, 64, 66; 425/445, 446

[56] References Cited

U.S. PATENT DOCUMENTS

| | | | |
|---|---|---|---|
| 4,608,942 | 9/1986 | Hayashi | 118/316 |
| 4,849,049 | 7/1989 | Colton | 118/313 |
| 5,335,682 | 8/1994 | Yoshimura et al. | 134/72 |
| 5,378,768 | 1/1995 | Ogisu et al. | |

FOREIGN PATENT DOCUMENTS 3-103448  4/1991  Japan .

*Primary Examiner*—David A. Simmons
*Assistant Examiner*—Calvin Padgett
*Attorney, Agent, or Firm*—Cushman Darby & Cushman, IP Group of Pillsbury Madison & Sutro LLP

[57] ABSTRACT

Four sets of shower heads 100, 200, 300, 400 are located in a surface modifying chamber of a surface modifying apparatus, and each shower head 100, 200, 300, 400 has surface modifier piping including a plurality of spray nozzles. The nozzles are arranged such that showers of an aqueous ozone solution injected from every adjacent two nozzles will contact the resin molded product and partly overlap one another. The phases in position of the nozzles can be offset a half-pitch or staggered with the staggered arrangement of the nozzles serving to compensate for any insufficient oxidation reaction to achieve uniform surface modification over the entire surface of the resin molded product 2. Further, the time required for the surface modification treatment can be reduced.

2 Claims, 5 Drawing Sheets

SURFACE MODIFYING APPARATUS FOR RESIN MOLDINGS

BACKGROUND OF THE INVENTION

1. Field of the Invention

The present invention relates generally to face modifying apparatus for modifying the surface of in molded products. More particularly, the present invention relates to surface modifying apparatus for modifying the surface of resin molded products containing the major component a polyolefin having relatively low face polarity, such as polypropylene.

2. Description of the Related Art

Resin molded products of polyolefins, typified by polypropyelene, are known to have relatively low surface polarity, so that it is difficult to effectively apply secondary surface treatments including coatings. Thus, when a polyolefin resin molded product is to be coated, the face of the product is first subjected to washing and modification such as roughening, using a solvent, for example, trichloroethane. Next, the thus washed and modified surface is subjected to a primer coating treatment or a plasma treatment. The thus treated resin molded product is polarized on the surface to achieve firm adhesion of the surface of the resin molded product with a facing material.

However, restrictions are increasing on washing with halogenized hydrocarbon organic solvents, including trichloroethane are and various techniques have been proposed as substitutes for such techniques of surface-modifying the polyolefin resin molded products using these organic solvents.

A new technique is disclosed, for example, in Japanese Unexamined Patent Publication No. Hei 3-103448, in which the surface of a polypropylene resin molded product is modified with an ozone gas stream. According to this technique, the polypropylene resin molded product is surface-modified by bringing it into contact with the ozone stream to oxidize on the surface and to have polar ups attached on the surface.

However, according to this technique, it is difficult to achieve uniform modification over the entire surface of the polypropylene resin molded product, particularly products having complicated shapes. Specifically, when the surface of a resin molded product is be modified uniformly, the entire surface of the resin molded product must be uniformly brought into contact with the ozone gas stream. However, it is difficult for a gas, generally having low viscosity compared with liquids, to flow along the surface of the resin molded product after the gas first contacts that surface.

Accordingly, uniform surface modification treatment cannot be achieved unless fine portions of the resin molded product are brought into direct contact with the ozone stream by moving the resin molded product or by changing angle at which the ozone stream is directed forward that surface. Thus, the number working steps is increased in order to achieve such uniform surface modification, making it difficult in to improve work efficiency.

With a view to coping with such inconvenience, the present inventors proposed a technique of oxidizing the surface of a polyolefin resin molded product by bringing it into contact with an aqueous ozone solution in Japanese Unexamined Patent Publication No. Hei 6-248103. According to this technique, the use of an organic solvent in the step prior to the surface modification step is omitted, and thus the surface of the resin molded product can be modified easily and uniformly. Therefore, when a coating is applied to the thus modified surface, the surface of the resin molded product and the coating layer are firmly adhered, and durability of the coating film is expected to improved.

However, since according to this technique the modification treatment is carried out by immersing the polyolefin resin molded product in the aqueous ozone solution at a predetermined temperature, the following inconveniences are liable to occur.

Specifically, as shown in FIG. 10, before a resin molded product 51 is immersed in the aqueous ozone solution in vessel 54, the product 51 is subjected to washing with water from jet nozzles 52 to wash off extraneous matters adhered on the product 51. However, this washing treatment is carried out while the product 51 is on a conveyor 53. Accordingly, when the product 51 moves to the immersion step, where it is immersed in the aqueous ozone solution, the thus washed product 51 must be transferred from the conveyor 53 into the immersion vessel 54 where it remains for treatment.

Meanwhile, in the washing step, the lower face of the product directly opposing conveyor 53 cannot be fully washed. Accordingly, during immersion contaminants adhered on that lower face may dissolve in the aqueous ozone solution contained in vessel 54. If such contaminants do dissolve in the aqueous ozone solution, the solution is contaminated, leading to the failure in achieving excellent surface modification.

Further, according to this prior art technique, since the resin molded product 51 is merely immersed in the aqueous ozone solution stored in vessel 54, resin molded ducts 51 cannot be successively brought into contact with the aqueous ozone solution containing unreacted ozone, requiring a relatively long time for achieving surface modification.

As a technique of canceling such inconvenience, there is contrived a technique of bringing the surface of resin molded product into contact with a flow of aqueous ozone solution. According to this technique, the surface modification treatment can be carried out continuously without interrupting a series of steps employing, for example, a conveyor. Besides, the resin molded products 51 can be constantly brought into contact with an aqueous ozone solution that contains unreacted ozone.

However, it is difficult to achieve modification uniformly over the entire surface of the resin molded product merely by bringing the resin molded product into contact with the flow of an aqueous ozone solution. More specifically, in this prior art technique, modification progresses more at those proportions of the resin molded product that are brought into frequent contact with the flow of aqueous ozone solution supplied, for example, from shower nozzles, but modification will be more difficult with those portions which are not brought into frequent contact with such flow. Accordingly, the surface of the resin molded product is nonuniformly modified depending on the degree of modification treatment achieved, and when the thus treated product is then subjected to a secondary treatment such as coating, the coating strength will likely be nonuniform.

SUMMARY OF THE INVENTION

Accordingly, it is a primary objective of the present invention to provide surface modifying apparatus which can impart, when polyolefin resin molded products having relatively low surface polarity are to be surface-modified, extremely excellent modification characteristics to such resin molded products in a short treatment time. It is another objective of the present invention to provide surface modifying apparatus which can prevent nonuniform modification from occurring on the face of polyolefin resin molded products.

To achieve the foregoing and other objects and in accordance with the purpose of the present invention, an apparatus for oxidizing a surface of a resin molded product with an ozone containing aqueous solution, wherein the said product substantially consists of a polyolefin, has a spray device for spraying the solution to The surface of the product. The spray device has a plurality of nozzles each being arranged to spray the solution within a predetermined spraying range that overlaps spraying range of adjacent nozzles. This produces a combined effect that oxidizes the surface of the product substantially equally.

BRIEF DESCRIPTION OF THE DRAWINGS

The features of the present invention that are believed to be novel are set forth with particularity in appended claims. The invention, together with the objects and advantages thereof, may best be understood by reference to the following description of the presently preferred embodiments together with the accompanying drawings in which:

DETAILED DESCRIPTION OF THE PREFERRED EMBODIMENTS

The present invention will be described below by of an embodiment of a surface modifying apparatus for resin molded products referring to the attached drawings.

Figure 3:
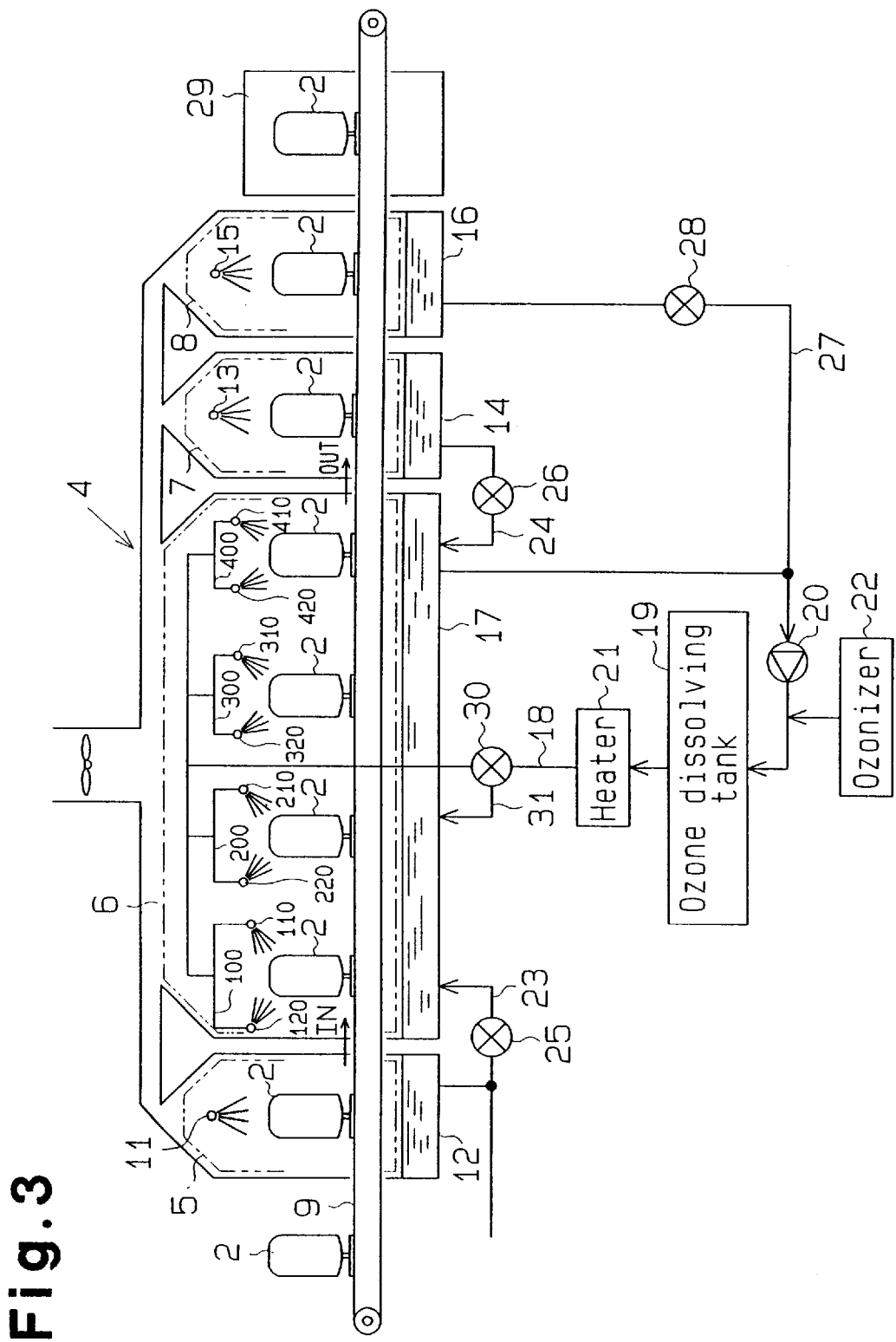
FIG. 3 is a schematic elevational view of a face modifying apparatus.
Figure 4:
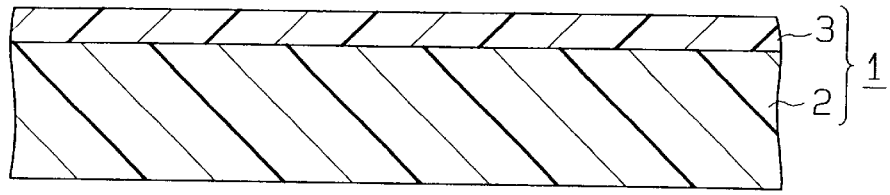
FIG. 4 is a partial cross sectional view of a resin product in which the surface of a resin molded product subjected to a surface modification treatment is coated.

FIG. 4 shows a resin molded product 1 produced employing a surface modifying apparatus 4 of FIG. 3. As shown in FIG. 4, the resin product 1 e.g., an automotive bumper, includes a resin molded product 2 and a coating layer 3 formed on a surface of the product 2. The resin molded product 2 was obtained, for example, by molding polypropylene in a mold into a desired shape, and the surface of the molded product 2 was subjected to a modification treatment (oxidation). According to this embodiment, a coating was directly applied onto the modified surface of the molded product 2 to form the coating layer 3. The coating layer 3 is, for example, a polyester coating admixed with chlorinated polypropylene.

The surface modifying apparatus 4 contains a power wash chamber 5, a surface modifying chamber 6, a purified water rinsing will be described referring to FIGS. 1 to 5.

As shown in FIG. 3, the surface modifying apparatus contains a power wash chamber 5, a surface modifying chamber 6, a purified water rinsing chamber 7 and a surface conditioning chamber 8. Resin molded products 2 are forward, for example, rightward in FIG. 3 by a conveyor 9 to pass through these chambers 5,6,7,8.

The power wash chamber 5, which is for briefly washing away contaminant adhered on the surface of each resin molded product 2, contains a pump (not shown), suitable power wash piping 11 and a drain tank 12. Water is sprayed against each resin molded product 2 from nozzles (not shown) connected to the power wash piping 11.

The surface modifying chamber 6 is for modifying surface of the resin molded product 2 with an aqueous ozone solution, and details of chamber 6 will be described later.

The purified water rinsing chamber 7, which is for removing the aqueous ozone solution remaining on the resin molded product 2, contains a pump (not shown), rinse piping 13 and a drain tank 14. Purified water is sprayed against the resin molded product 2 from nozzles (not shown) connected to the rinse piping 13.

The surface conditioning chamber 8, which is for accelerating evaporation of purified water remaining on resin molded product 2 after completion of rinsing, contains a pump (not shown), surface conditioner piping 15 and a drain tank 16. Surface conditioning water is sprayed against the resin molded product 2 from nozzles (not shown) that are supplied with such water by surface conditioner piping 15. Any surface conditioning water can be used so long as it lowers the surface tension of any purified water remaining on the resin molded product 2 and thereby helps to accelerate evaporation of purified water and drying of the resin product 2. In this embodiment, the surface conditioning water can be, for example, purified water incorporated with a surface conditioner (e.g., a surfactant such as a polyoxyethylene alkyl ether).

The surface modifying chamber 6 in this embodiment, which is disposed between the power wash chamber 5 and purified water rinsing chamber 7, contains four sets of shower heads 100,200,300,400 and a drain tank 17.

A drain line 40 leads from tank 17 to a pump 20. Also connected to the output side of pump 20 is an ozone dissolving tank 19 and a heater 21 via suitable piping. An ozonizer 22 is also connected to the piping leading from pump 20. The aqueous ozone solution in the drain tank 17 is introduced via the up 20 into the ozone dissolving tank 19. Ozone generated the ozonizer 22 is supplied to the ozone dissolving tank where an aqueous ozone solution is formed and stored. The aqueous ozone solution formed in the ozone dissolving tank 19 is warmed by a heater 21 to a predetermined temperature (e.g., 50° C.).

A pipe section 18 interconnects the output from heater 21 and the shower heads 100 to 400 and includes a bypass line 31 which is connected via a selector valve 30. The bypass line 31 is connected to the drain tank 17. The selector valve 30 permits switching the flow direction of the aqueous ozone solution warmed by the heater 21 between the shower heads 100 to 400 to the bypass line 31 and thus directly back to tank 17.

This selector valve 30 secures communication between the main piping 18 and the bypass line 31 when the surface modifying apparatus 4 is started and when the conveyor 9 is in a pause mode. The reason is that neither the running state of the surface modifying apparatus 4 nor the treatment conditions are not stabilized immediately after apparatus 4 is started, and thus uniform surface modification treatment cannot be applied to the resin molded products 2. Meanwhile, when the conveyor 9 is in the pause mode, the conveyor 9 is stopped together with the resin molded products 2, and if the aqueous ozone solution continued to be sprayed from the shower heads 100 to 400, the surface of the resin molded products 2 would be excessively modified.

Under the other conditions, the selector valve 31 secures communication between the main piping 18 and the shower heads 100 to 400, and the aqueous ozone solution is sprayed against the resin molded products 2 from the respective shower heads 100 to 400.

Figure 1:
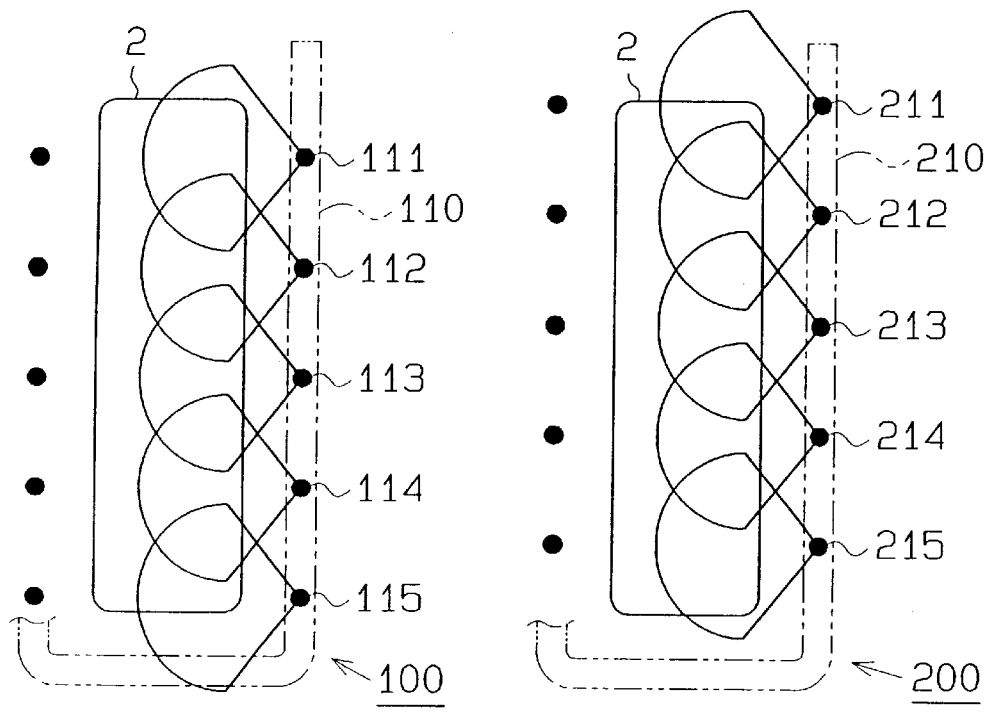
FIG. 1 is a top plan schematic view showing a portion of a group of shower heads according to one embodiment of the present invention.
Figure 2:
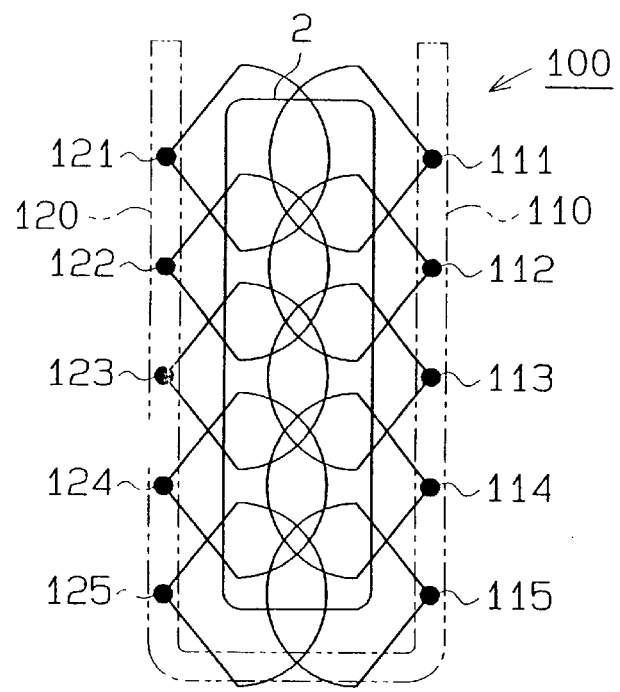
FIG. 2 is a top plan schematic view showing a portion of another shower head according to the embodiment of the present invention.
Figure 5:
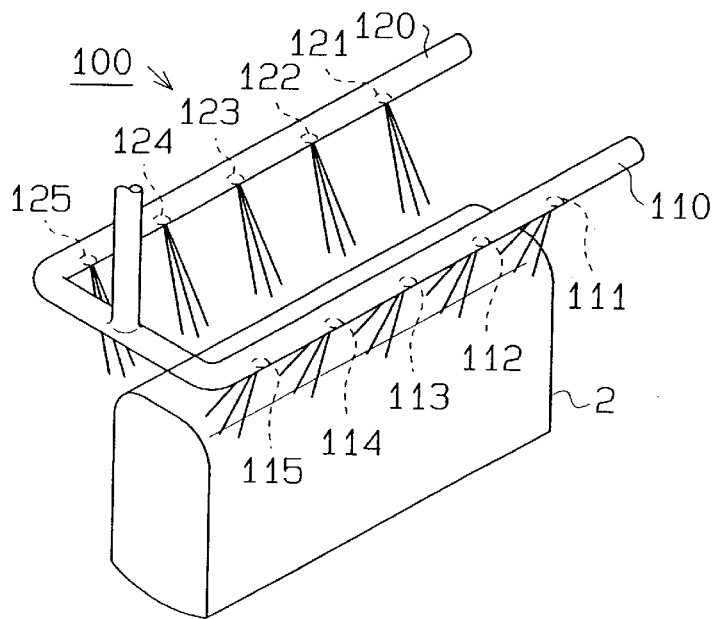
FIG. 5 is a perspective view of a shower head according to the embodiment of the present invention.

As shown in FIGS. 3 and 5, the shower heads 100 to are arranged parallel to one another and have pairs of linear surface modifier pipings, each pair having of a left piping section and a right piping section, numbered 110, 120, 210, 220, 310, 320, 410, 420, respectively. Meanwhile, as shown in FIGS. 1, 2, and 5, pipe sections 110, 120, 210, 220 each have five nozzles referenced at 111 to 115, 121 to 125, 211 to 215 or 221 to 225, respectively, and arranged at equal intervals. Each of the other pipe sections, 310, 320, 410, 420, shown in FIG. 3, also have five nozzles arranged there along at equal intervals. The aqueous ozone solution is sprayed from these nozzles radially to be brought into contact with resin molded products 2.

In this embodiment, the nozzles 111 to 115, 121 to 125, 211 to 215 and 221 to 225 are arranged such that showers of the aqueous ozone solution emanating from every adjacent two nozzles, and brought into contact with the resin molded products 2, may partly overlap one another, as shown in FIGS. 1 and 2.

Meanwhile, as shown in FIGS. 1 and 2, the positions (phases) of the nozzles 111 to 115 and 121 to 125 are designed to be half-pitch staggered from those of the nozzles 211 to 215 and 221 to 225 in the respective adjacent shower heads 100 and 200 While only two shower heads 100, 200 are shown in FIG. 1, the nozzles are arranged likewise in the other shower heads 300, 400.

Further, as shown in FIG. 3, the shower heads 100 to 400 are arranged such that they may inject the aqueous ozone solution against the resin molded products 2 at different injection angles. Specifically, the angle of the nozzles are set such that the aqueous ozone solution may be first brought into contact with the side surfaces of the molded resin products 2 and gradually with the upper faces. Using nozzles arranged at such angles brings the aqueous ozone solution into contact with the surfaces (designed faces) of the resin molded products 2 uniformly.

This embodiment includes a mechanism for making up for water consumed for adjustment of the ozone level of the aqueous ozone solution or lost by evaporation and the like. Specifically, the drain tank 12 in the power wash chamber 5 and the drain tank 17 in the surface modifying chamber 6, as well as, the drain tank 14 in the purified water rinsing chamber 7 are connected to each other by communicating pipes 23 and 24, respectively. The communication pipes 23, 24, contain valves 25, 26, respectively. The amount of purified water to be supplied to the drain tank 17 in the surface modifying chamber 6 is adjusted by appropriately opening or closing these valves 25, 26.

The aqueous ozone solution employed for surface modification of the resin molded products 2 is as follows. The hydrogen ion index (hereinafter simply referred to as pH) of the aqueous ozone solution is desirably 7 or less, particularly about 3 to 7, based on following reason. Generally, solubility of ozone increases as the acidity of water (solvent) increases, so that the ozone concentration of the aqueous ozone solution can be increased by increasing the acidity of water. However, the activity of ozone is lowered as the acidity of water increases. Accordingly, the aqueous ozone solution is desirably weakly acidic, i.e. about pH 3 to 7.

In this embodiment, pH of the aqueous ozone solution is set to 6, and an organic acid such as carboxylic acid, is admixed to the solution so as to maintain this pH level. More specifically, the ozone dissolving tank 19 in the surface modifying chamber 6 and the drain tank 16 in the surface conditioning chamber 8 are connected via a communicating pipe 27, that includes valve 28. When valve 28 is opened, an aqueous solution containing a surface conditioner (polyoxyethylene alkyl ether) is introduced from the drain tank 16 to the ozone dissolving tank 19 via the communicating pipe 27.

The surface conditioner introduced to the ozone dissolving tank 19 is decomposed and oxidized into an organic acid (carboxylic acid) under the strong oxidizing power of ozone contained in the aqueous ozone solution. That is, the surface conditioner in this embodiment is utilized in the surface conditioning chamber 8 for accelerating evaporation of water remaining on the resin molded product 2 in the subsequent drying step, and in the surface modifying chamber 6 the surface conditioner is oxidized into an organic acid to be utilized as a pH adjuster for adjusting pH of the aqueous ozone solution.

Incidentally, in this embodiment, the drain tanks 12, 14, 16, 17 each contain measuring instruments (not shown) such as a thermometer, a water level gauge and a pH-meter and also a controller (not shown). The controller suitably controls the conveyor 9, pumps 20 . . . , heater 21, ozonizer 22 and valves 25, 26, 28 based on the detection results of these measuring instruments.

The chambers 5 to 8 in the surface modifying apparatus 4 are partitioned by walls, and the walls each have a door (not shown) at the portions where the conveyor 9 runs. Under running of the conveyor 9, the doors are opened to allow passage of the conveyor 9 and the resin molded products 2 loaded on it. Further, a dryer 29 is disposed adjacent to the surface modifying apparatus 4, in which the surface of the resin molded product 2 underwent the surface conditioning step for drying products discharged from apparatus 4.

Next, the method of modifying the surfaces of the resin molded products 2 employing the thus constituted face modifying apparatus 4, as well as, actions and effects of the modification treatment will be described.

First, a resin molded product 2 molded into a determined shape in a mold is loaded on a running conveyor 9, with the designed face facing upward, and is moved from left to right in FIG. 3.

The resin molded product 2 moving together with the conveyor 9 is guided first into the power wash chamber 5 of the surface modifying apparatus 4. When the product 2 reaches a predetermined position, the conveyor 9 is stopped for a predetermined time, and water is sprayed from the nozzle tips of the power wash piping 11 against the surface of the resin molded product 2. This water flow removes contaminants such as dusts and the like adhered on the surface of the resin molded product 2.

Next, the resin molded product 2 is carried further by the conveyor into the surface modifying chamber 6. When the product 2 reaches a predetermined position beneath the first shower head 100, the conveyor 9 is stopped again for a predetermined time. An aqueous ozone solution is then injected radially from the nozzles 111 to 115 and 121 to 125 of the first shower head 100 against the resin molded product 2. The surface of the resin molded product 2 is oxidized when it is brought into contact with the injected aqueous ozone solution, and polar groups are attached to the surface. Namely, the surface of resin molded product 2 is modified.

It should be noted here that, in this embodiment, nozzles 111 to 115 and 121 to 125 are arranged such that showers of the aqueous ozone solution injected from every adjacent two nozzles and brought into contact with resin molded product 2 may partly overlap one another, as shown in FIG. 2. Accordingly, such surface area of the resin molded product 2 which is brought into contact with the periphery of the shower of aqueous ozone solution injected from one nozzle 111 to 115, 121 to 125 and thus cannot be oxidized to a sufficient level can be brought into contact with the aqueous ozone solution injected from other adjacent nozzles 111 to 115, 121 to 125 to compensate for any insufficient oxidation reaction. Consequently, surface modification can be achieved uniformly over the entire surface of the resin molded product 2.

After the aqueous ozone solution is injected radially for a predetermined time as described above, the resin molded product 2 is moved by the conveyor 9 rightward in FIG. 3, and the conveyor 9 is stopped again when the resin molded product 2 reaches a predetermined position beneath the next shower head. The aqueous ozone solution is then injected radially from nozzles 211 to 215, 221 to 225 of the second shower head 200 against the resin molded product 2.

Thus, the aqueous ozone solution is brought into contact with the surface of the resin molded product 2 in the same manner as described above to encourage oxidation reaction on the surface of the resin molded product 2 and to promote surface modification of the resin molded product 2. The nozzles 211 to 215, and 221 to 225 are arranged such that showers of the aqueous ozone solution injected from every adjacent two nozzles to be brought into contact with the resin molded product 2 may partly overlap one another. Accordingly, such arrangement of the nozzles mutually compensates for any insufficient oxidation reaction on the surface of the resin molded product 2, and thus the surface modification can be achieved uniformly over the entire surface of the resin molded product 2 as is desired from the first shower head.

The positions (phases) of the nozzles 211 to 215, and 221 to 225 of the second shower head 200 are designed to be half-pitch staggered from those of the nozzles 111 to 115 and 121 to 125 of the first shower head 100. Accordingly, if there remains on the surface of the resin molded product 2 any area which failed to be modified fully by the first shower head 100, the aqueous ozone solution injected from the nozzles 211 to 215, 221 to 225 of the second shower head 200 compensates for any such insufficient oxidation reaction. Consequently, the surface modification can be achieved uniformly over the entire surface of the n molded product 2 as is desired from the second shower head.

In addition, the aqueous ozone solution is designed to be injected at different injection angles in the second shower head 200 from those in the shower head 100. Accordingly, the aqueous ozone solution is more uniformly brought into contact with the surface (designed face) of the resin molded product 2, further enhancing achievement of uniform surface modification.

The aqueous ozone solution is injected radially from the second shower head 200 for a predetermined time, followed successively by a cycle of running the conveyor 9, stopping the conveyor 9 and injecting the aqueous ozone solution from the nozzles of the third shower head, and another cycle of running the conveyor 9, stopping the conveyor 9 and injecting the aqueous ozone solution from the nozzles of the fourth shower head 400. In these cycles, the same effects as described above can be obtained.

Subsequently, the thus surface-modified resin molded product 2 is moved by the conveyor 9 to the purified water rinsing chamber 7 (rightward again in FIG. 3) so as to wash the surface-modified resin molded product 2 with a purified water, and the conveyor 9 is stopped when the resin molded product 2 reaches a predetermined position. The purified water is sprayed from the nozzles of the rinse piping 13 against the resin molded product 2. Thus, the aqueous ozone solution remaining on the surface of the resin molded product can be washed off, thus cleaning the surface of the resin molded product 2.

Next, the resin molded product 2 is then moved by conveyor 9 to the surface conditioning chamber 8 (rightward again in FIG. 3) so as to adjust surface tension of the liquid remaining on the surface of the thus washed resin molded product 2, and the conveyor 9 is stopped when the product 2 reaches a predetermined position. The surface conditioning water is sprayed from the nozzles of the surface conditioner piping 15 against the resin molded product 2. Thus, surface tension of the liquid, e.g., water, remaining on the surface of the resin molded product 2 lowered, and the amount of water remaining on the surface of the resin molded product 2 can be reduced compared with the amount of purified water remaining on the surface of the resin molded product 2 before treatment in the chamber 8.

The resin molded product 2 is thereafter moved by the conveyor 9 to the dryer 29 (rightward in FIG. 3) so as to dry the surface of the surface-conditioned resin molded product 2, and the conveyor 9 is stopped when the product 2 reaches a predetermined position to carry out drying of the surface of the product 2 for a predetermined time. Since the amount of surface conditioning water remaining on the surface of the resin molded product 2 is relatively small, and the evaporation speed of the surface conditioning water is higher than that of the purified water, the surface of the resin molded product 2 can be speedily dried.

By undergoing such series of steps, surface modification of the resin molded product 2 is completed. Following drying the product is forwarded to a secondary treatment step, such as a coating step. In the coating step, a predetermined coating, as described above, is applied to the product 2. Subsequently, the coating is dried again to form a coating layer 3 on the surface of the resin molded product 2.

As described above, the surface of the resin molded product 2 can be oxidized and polarized by the oxidizing power of ozone in this embodiment. Further, the aqueous ozone solution is brought into positive and uniform contact with the entire designed surface of the resin molded product 2 irrespective of the shape of the product 2 (on automobile bumper in this embodiment).

Accordingly, the oxidation reaction takes place relatively uniformly over the entire surface of the resin molded product 2 to prevent nonuniform reaction from occurring on the surface of the product 2. Further, since the aqueous ozone solution is injected continuously, the oxidation reaction is promoted to reduce the treatment time. In addition, since the aqueous ozone solution is injected radially into contact with the resin molded product 2, the products 2 loaded on the conveyor 9 can be successively subjected to modification treatment unlike in the prior art where a resin molded product 2 which underwent the power washing step must then be unloaded from the conveyor and immersed in the aqueous ozone solution. Consequently, not only the modification equipment can be simplified, but also the installation space can be lessened and production costs reduced.

In this embodiment, the nozzles 111 to 115, 121 to 125, 211 to 215 and 221 to 225 are arranged such that showers of the aqueous ozone solution injected from every adjacent two nozzles will contact the surface of the resin molded products 2 and may partly overlap another. Accordingly, such surface area of the resin molded product 2 which is brought into contact with the periphery of the shower of aqueous ozone solution injected from one nozzle 111 to 115, 121 to 125 and thus failed to be oxidized to a sufficient level can be brought into contact with the aqueous ozone solution injected from other adjacent nozzles 111 to 115, 121 to 125 to compensate for any insufficient oxidation reaction. Consequently, the surface modification can be achieved uniformly over the entire surface of the resin molded product, and further occurrence of nonuniform modification can be prevented. Accordingly the coating layer 3 formed on the surface of the resin molded product 2 can be prevented from having nonuniform coating strength (peeling strength).

The positions (phases) of the nozzles 211 to 215 and 221 to 225 of the second shower head 200 are designed to be half-pitch staggered from those of the nozzles 111 to 115 and 121 to 125 of the first shower head 100 in this embodiment. The positions of the nozzles in the third shower head 300 are also half-pitch staggered from those in the fourth shower head 400. Accordingly, even if there remains on the surface of the resin molded product 2 any area which failed to be fully modified by the first shower head 100, the insufficient oxidation reaction can be compensated for by the aqueous ozone solution injected from the nozzles 211 to 215, 221 to 225 . . . of the second, third and fourth shower heads 200, 300, 400. Thus, the surface modification can be achieved more uniformly over the entire surface of the resin molded product.

Figure 6:
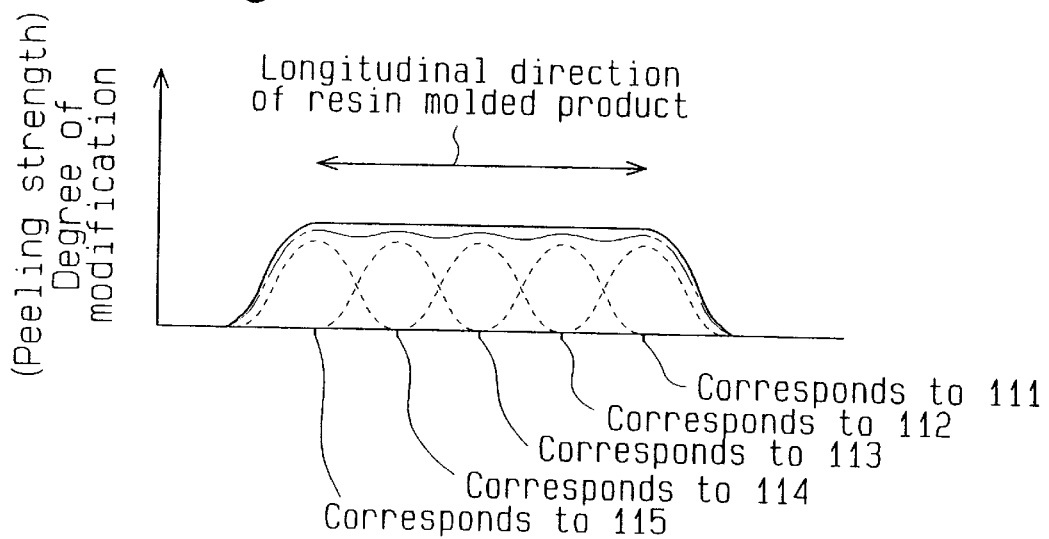
FIG. 6 is a graph showing the degree of modification achieved in the longitudinal direction of a resin molded product.

FIG. 6 is a graph showing the effect to be exhibited by the surface modifying apparatus 4 according to this embodiment. The ordinate represents the modification level (peeling strength of the coating layer 3 formed on the surface of the resin molded product 2) and while the abscissa represents positions on the resin molded product 2 in the longitudinal direction. As indicated by the broken lines in FIG. 6, the modification level achieved the aqueous ozone solution injected from each nozzle 111 to 115, 121 to 125 is not uniform in the longitudinal direction of the resin molded product 2.

It is attributed to the characteristics of the aqueous ozone solution injected radially from each nozzle that the distribution density of the aqueous ozone solution is sparser from the center toward the periphery. Accordingly, the surface of the resin molded product 2 brought into contact with the aqueous ozone solution at the central portion of the shower can be relatively easily modified, but it can be modified less easily at the peripheral portion of the shower. However, in this embodiment, the nozzles are arranged such that showers of the aqueous ozone solution may partly overlap one after another. Accordingly, the modification level can be equalized over the entire surface of the resin molded product 2 as indicated by the dot-and-dashed line in FIG. 6, preventing nonuniform modification attributed to the difference in modification level from occurring.

Further, in the subsequent step, any oxidation reaction which took place insufficiently can be compensated for by the aqueous ozone solution injected from the second, third and fourth shower heads 200, 300, 400 having nozzles 211 to 215, 221 to 225 . . . In other words, the apparatus is designed to include a plurality of shower heads 100 to 400 and the positions of the nozzles 111 to 115, 121 to 125, 211 to 215, 221 to 225 . . . of those shower heads 100 to 400 are staggered, respectively. Accordingly, uniform modification can be achieved finally in the longitudinal direction as indicated by the solid line in FIG. 6.

Ad described above, the surface modifying apparatus 4 includes the power wash chamber 5, the surface modifying chamber 6, the purified water rinsing chamber 7 and the surface conditioning chamber 8, which are integrated into one unit. Because of this sequence, the power wash chamber 5 (power wash piping 11) and the purified water rinsing chamber 7 (rinse piping 13) act as barriers for steadily restricting outflow of the aqueous ozone solution and ozone gas employed in the surface modifying chamber 6.

Since the resin molded product 2 treated in each step is not exposed to the outside air, the product 2 remains uncooled not to hinder the oxidation reaction. Specifically, since the surface modifying apparatus 4 is entirely warmed by the aqueous ozone solution in the surface modifying chamber 6, there is no need of providing an extra warming means, leading to improvement in heat efficiency.

In addition, the surface conditioning water is admixed to the aqueous ozone solution so as to maintain the pH of the aqueous ozone solution at a constant level in this embodiment. The organic acid obtained after decomposition and oxidation of the surface conditioning water by ozone is utilized as a pH adjuster. Since the organic acid obtained by oxidation of the surface conditioning water is further decomposed and oxidized to be converted finally into carbon dioxide and water, the valve 28 is occasionally opened to supplement the surface conditioner and promote formation of the organic acid, thus achieving pH adjustment.

Therefore, delicate handling of acid is not required in this embodiment, unlike in the prior art technique where an inorganic acid, particularly a strong acid, is employed for pH adjustment. The organic acid obtained by oxidation of the water-soluble organic solvent (surface conditioner) is oxidized and decomposed again, after completion of pH adjustment, by ozone to be converted finally into carbon dioxide and water. Consequently, after composition of the organic acid, there is no worry about corrosion of the apparatus by the organic acid.

The surface conditioner admixed to the aqueous ozone solution not only serves as a pH adjuster but also fully exhibits the intended essential function of accelerating drying. Accordingly, the waste surface conditioning water can be utilized for pH adjustment, leading to reduction in the cost on a great margin. Further, the trouble of treating the waste surface conditioning water can be eliminated to further achieve cost reduction.

In order to confirm the actions and effects specific to this embodiment, oxidation of the surface conditioner by ozone was tested on the scale of a beaker, which will be described below.

Test Equipment

Test equipment employed for the surface modification will be described first. This test employed test equipment in which ozone generated an ozonizer is bubbled into 4 L of industrial water contained in a vessel to maintain the ozone concentration at a fixed level (4 ppm). The temperature of the aqueous ozone solution was maintained at 50° C.

Procedures and Test Results

Using the above test equipment, the pH of the aqueous ozone solution was measured at predetermined time intervals.

Figure 7:
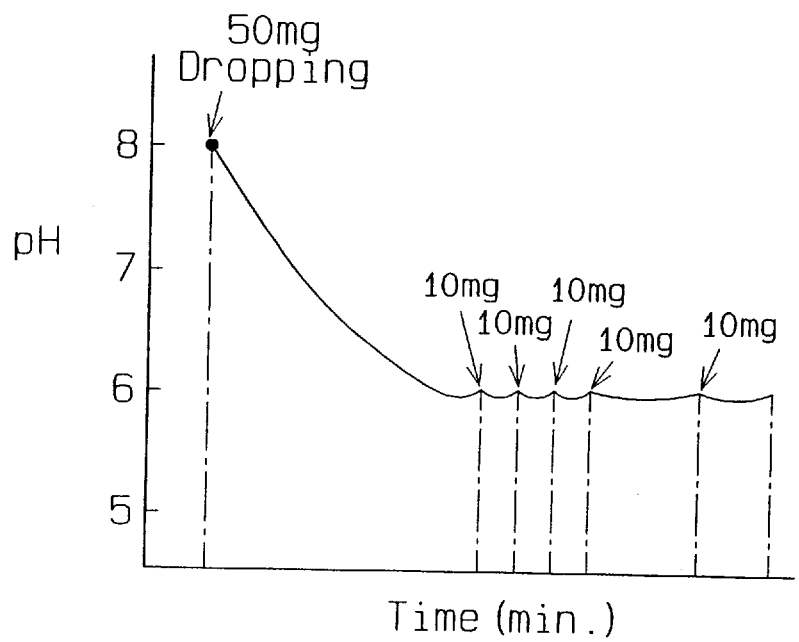
FIG. 7 is a graph showing a relationship between treatment time and pH of the aqueous ozone solution demonstrated by tests.
Figure 8:
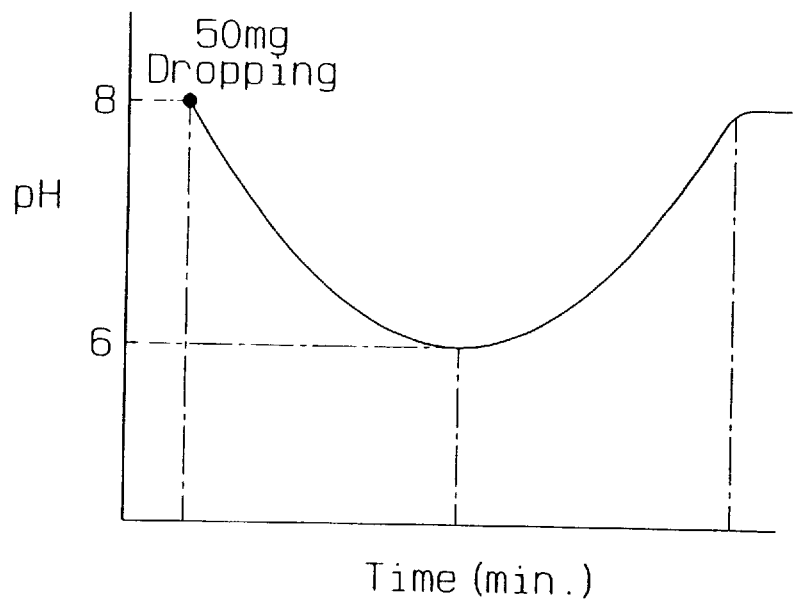
FIG. 8 is also a graph showing a relationship between treatment time and pH of the aqueous ozone solution demonstrated by tests.

First, test results when ethanol was dropped as the surface modifier to the aqueous ozone solution are shown in FIGS. 7 and 8. FIG. 7 is a graph showing test results when 50 mg of ethanol was added once; whereas FIG. 8 is a graph showing test results when ethanol was successively added in certain amounts to the aqueous ozone solution so as to maintain pH of the solution at 6 under monitoring of a pH-meter. In FIGS. 7 and 8, the ordinate represents pH of the aqueous ozone solution, and the abscissa represents time (minutes).

As shown in FIG. 7, when 50 mg of ethanol was added to the aqueous ozone solution, pH of the solution drops gradually at the initial stage and then increases gradually after a predetermined time. It can be understood from the characteristic curve of the graph that when the ethanol is added to the aqueous ozone solution it is first oxidized by ozone and converted into acetic acid via acetaldehyde, and that the acetic acid is thereafter decomposed and oxidized after passage of a predetermined time into carbon dioxide and water.

Meanwhile, as shown in FIG. 8, it can be understood that pH of the aqueous ozone solution can be maintained at a predetermined level by repeatedly adding 10 mg of ethanol after the initial addition of 50 mg of the same.

Figure 9:
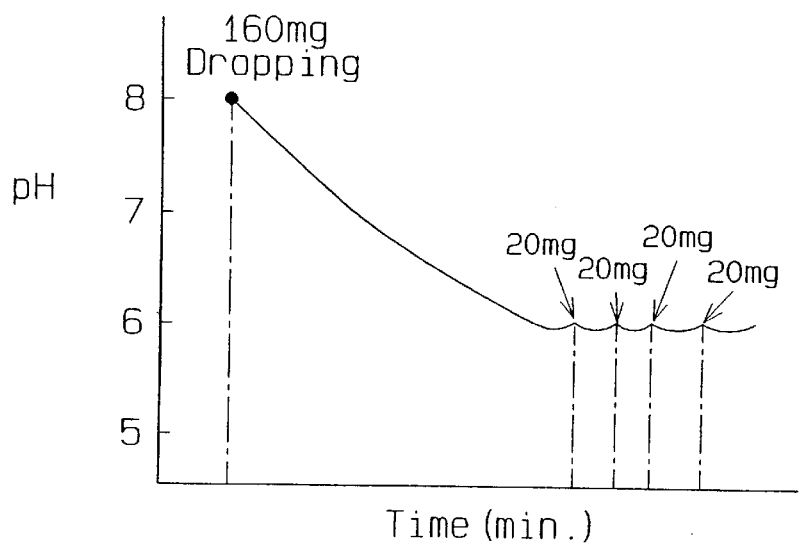
FIG. 9 is another graph showing a relationship between treatment time and pH of the aqueous ozone solution demonstrated by tests.
Figure 10:
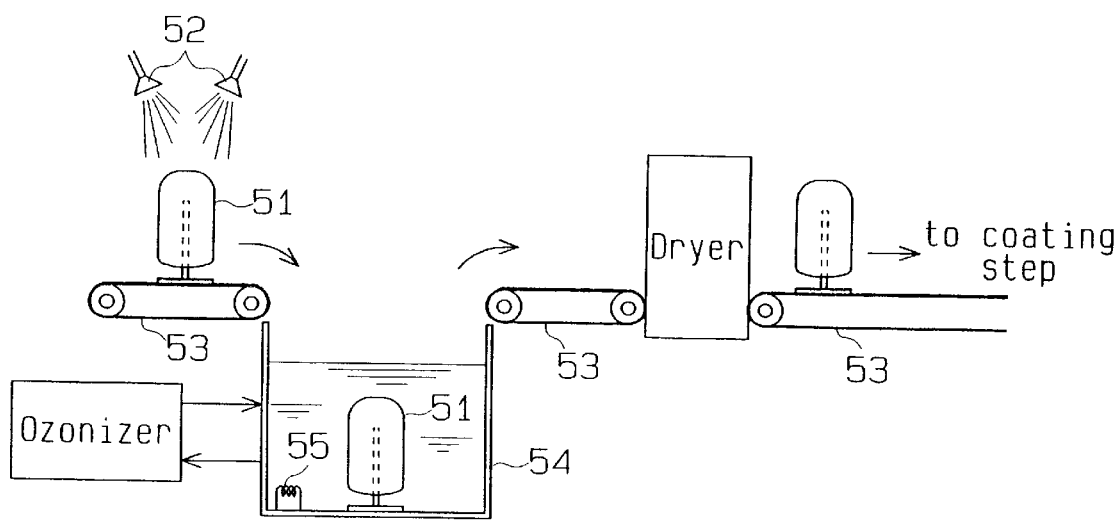
FIG. 10 is a schematic elevational view of a prior art surface modifying system.

Further, FIG. 9 is a graph showing test results when a polyoxyethylene alkyl ether was added successively in place of ethanol so as to maintain the pH of the aqueous ozone solution at 6. In FIG. 9, the ordinate represents the pH of the aqueous ozone solution, and the abscissa represents time. As shown in FIG. 9, similar results to the case where ethanol was successively added were obtained when 20 mg of polyoxyethylene alkyl ether was added repeatedly after the initial dropping of 160 mg of the same. That is, any water-soluble organic solvent which is added to the aqueous ozone solution can be converted into an organic acid by the oxidizing power of ozone, and the thus converted organic acid can be further decomposed.

Although only one embodiment of the present invention has been described herein, it should be apparent to those skilled in the art that the present invention may be embodied in many other specific forms without departing from the spirit or scope of the invention. Particularly, it should be understood that the present invention may be embodied in the following manners:

(1) In the embodiment described above, the aqueous ozone solution is designed to be sprayed against the designed face (upper face) of the resin molded product 2. However, in the case where the entire surface of the resin molded product 2 is a designed face, the aqueous ozone solution may be adapted to be sprayed from other sides (e.g., from the rear side).

(2) In the embodiment described above, polypropylene is employed as the polyolefin resin molded product. However, the present invention may be applied to any resin molded products so long as they contain a polyolefin as the major component, for example, polyethylene resin molded products and resin molded products incorporated with other secondary components. Meanwhile, the shape of the resin molded products is not limited to that of bumper, and it may be, for example, various automotive external parts including grilles, garnishes, moldings, spoilers, lamps, marks, emblems and wheel covers, and many others.

(3) In the embodiment described above, a polyoxyethylene alkyl ether or ethanol was employed as the surface conditioner. However, other water-soluble organic solvents (e.g., other alcohols, ethers, aldehydes, carboxylic acids, ketone, esters, amine) may be employed.

(4) In the embodiment described above, a polyester coating incorporated with chlorinated polypropylene is employed. However, any other coating including one obtained by graft polymerization or block polymerization of polyester with chlorinated polypropylene.

Therefore, the present example and embodiment are to be considered as illustrative and not restrictive, and the invention is not to be limited to the details given herein, but may be modified within the scope of the appended claims.

What is claimed is:

1. An apparatus for oxidizing a surface of a polyolefin resin molded product with an ozone containing aqueous solution, said apparatus comprising:

a spray device having a plurality of nozzles arranged in a plurality of adjacent rows, the plurality of nozzles in each adjacent row being equally spaced from one another, with each nozzle in one of said plurality of rows being offset, in a direction along such row, from adjacent nozzles in an adjacent one of said plurality of rows to thereby spray an aqueous ozone solution, including a pH adjusting material, which contains a water-soluble organic solvent, for maintaining the pH of said solution within a range of between about 3 and about 7, within a predetermined spraying range overlapping the spraying range of adjacent nozzles, whereby the entire surface of the product is substantially equally sprayed and thereby equally oxidized;

transporting system for moving said product through said apparatus, said spray device having an entrance for receiving said product moved by said transport system and an exit through which said product oxidized in said spray device is discharged;

pre-washing means, adjacent to said entrance, for washing said product before it is sprayed by said spray device;

post-washing means, adjacent to said exit, for washing said product after it is sprayed by said spray device using a water soluble washing agent including a surface conditioner for accelerating surface drying;

means for adjusting surface tension of solution covering a surface of said product washed by said post-washing means;

means for drying the surface covered by said solution;

a surface conditioning chamber for accelerating evaporation of purified water remaining on the product after completion of post-washing;

a drain tank disposed in the surface conditioning chamber; and an ozone dissolving tank communicating with the drain tank;

wherein said spray device, said transporting system, said prewashing means and said post-washing means form a unit.

2. The apparatus according to claim 1, wherein the offset distance is equal to one half of the equal spacing.

* * * * *